(12) United States Patent
Lanning

(10) Patent No.: US 7,739,552 B2
(45) Date of Patent: Jun. 15, 2010

(54) TAPPING A MEMORY CARD

(76) Inventor: Eric J. Lanning, 284 Marti Way, San Jose, CA (US) 95136

( * ) Notice: Subject to any disclaimer, the term of this patent is extended or adjusted under 35 U.S.C. 154(b) by 569 days.

(21) Appl. No.: 11/552,125

(22) Filed: Oct. 23, 2006

(65) Prior Publication Data

US 2007/0260800 A1 Nov. 8, 2007

Related U.S. Application Data

(60) Provisional application No. 60/774,795, filed on Feb. 17, 2006.

(51) Int. Cl.
*G06F 11/00* (2006.01)
(52) U.S. Cl. .................................. 714/39
(58) Field of Classification Search .............. 714/39
See application file for complete search history.

(56) References Cited

U.S. PATENT DOCUMENTS

| 3,653,019 | A | * | 3/1972 | Barton et al. ................ 340/659 |
| 5,260,970 | A | * | 11/1993 | Henry et al. ................. 375/224 |
| 5,835,751 | A | * | 11/1998 | Chen et al. .................... 716/16 |
| 6,694,464 | B1 | * | 2/2004 | Quayle et al. ............... 714/725 |
| 2001/0025353 | A1 | * | 9/2001 | Jakel ........................... 714/37 |
| 2002/0177990 | A1 | * | 11/2002 | Sample ........................ 703/28 |
| 2004/0158793 | A1 | * | 8/2004 | Blightman et al. .......... 714/758 |
| 2004/0193985 | A1 | * | 9/2004 | Bhora et al. ................. 714/733 |
| 2006/0083511 | A1 | * | 4/2006 | Edmunds et al. .............. 398/25 |

* cited by examiner

*Primary Examiner*—Scott T Baderman
*Assistant Examiner*—Yair Leibovich
(74) *Attorney, Agent, or Firm*—Workman Nydegger

(57) ABSTRACT

A protocol analyzer for analyzing traffic on a bus. A system includes a tap, a pod and an analyzer. The tap includes differential inputs for the bus. One of the differential inputs is a line from the bus and the other is a reference input that has been divided. The reference input enables the system to determine whether data on the bus is high or low even in situations where the operating voltage of the bus is unknown.

17 Claims, 2 Drawing Sheets

TAPPING A MEMORY CARD

CROSS REFERENCE TO RELATED APPLICATIONS

This application claims the benefit of U.S. Provisional Application Ser. No. 60/774,795 filed Feb. 17, 2006 and entitled TAPPING A MEMORY CARD, which application is incorporated by reference in its entirety.

BACKGROUND OF THE INVENTION

1. The Field of the Invention

The present invention relates to analyzing signals between a host and a device by tapping the bus. More particularly, embodiments of the invention relate to detecting the operating voltages of the device while tapping the bus between the host and the device.

2. The Relevant Technology

Protocol Analyzers are devices that help diagnose and detect problems that occur on networks. Protocol analyzers can also be used on buses that exist between a host and a device for similar purpose. Typically, protocol analyzers view traffic on the network or over a bus or other connection as it occurs. As the data is being monitored, the protocol analyzer may detect a problem or some defined condition. At this point, the analyzer triggers and captures the data present on the network or occurring on the bus. The range of data captured can depend on the size of the analyzer's buffer. The analyzer can also be configured such that the captured data represents data that occurred before the triggering event, after the triggering event, and/or both before and after the triggering event. In addition, the data can also be captured without a triggering event. Rather, data can be captured until the buffer is full. In effect, the capture is a snapshot of the data that was present on the network around the time that a problem occurred. The captured data can then be analyzed to help resolve many problems and improve communications on the network or between a host and a device.

Some protocols, however, are difficult to implement in analyzers. SD (Secure Digital Cards), SDIO (SD Input/Output Cards), MMC (Multimedia Cards) and CE-ATA (Consumer Electronics-Advanced Technology Attachment) are examples of protocols that are difficult to analyze. Some of the reasons are related to the physical sizes of devices that use SD, SDIO, MMC or CE-ATA. Other reasons are related to the cost. CE-ATA connectors, for example, have a limited number of insertion cycles. Because protocol analyzers are repeatedly connected and disconnected, cost can become a significant issue when analyzing CE-ATA. In addition, many consumer devices do not operate at the same voltage levels. This can complicate the issue of connecting a system to a protocol analyzer when the voltage levels are not known beforehand.

SUMMARY OF EMBODIMENTS OF THE INVENTION

These and other limitations are overcome by embodiments of the invention, which relate to systems and methods for tapping a memory card. Embodiments of the invention relate to a system or an apparatus that enables the communications or protocol between a host and a device such as a memory card to be monitored or analyzed.

Advantageously, embodiments of the invention can function even when the operating voltage of the system under test is unknown. In one example, a system includes a pod that can removably connect with a protocol analyzer. The pod, in turn, can removably connect with a tap that is often configured or has a form factor specific to the system under test. The tap may provide an ID to the pod that enables the pod to interpret the signals tapped from the bus or that enables the protocol analyzer to configure the pod by programming an FPGA on the pod.

The tap provides a pass through bus and taps the signal using a repeater. The repeater has differential inputs. One of the inputs to each differential input is a line of the bus and the other input is a reference voltage. The reference voltage is often generated using the operating voltage of the host/device system (e.g., Vcc). A reference voltage circuit divides the operating voltage down to a level that can be used to determine whether signals on the bus are high or low. The output of the tap can be single ended or differential in nature.

The tap itself may have a form factor that enables it to be used with multiple protocols. Typically a first end connects with a host and the other end connects with a device such as a memory card. A pass through bus connects the first end to the second end such that the host and device can continue to function. Often, the repeater connects to the bus in a manner that minimizes impedance mismatches or that minimizes bus interruptions. A voltage reference circuit is used to generate a reference voltage that can be used to determine whether signals on the bus are high or low. Thus the tap or pod or protocol analyzer does not need to know the operating voltage of the host/device system, but can still provide protocol analysis.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Embodiments of the invention overcome the limitations of conventional systems and relate to systems and methods for performing protocol analysis. More particularly, embodiments of the invention relate to a protocol analysis system that supports protocols including, but not limited to, SD, SDIO, MMC and CE-ATA protocols or the combination thereof in cases where a CE-ATA device is included in a device that otherwise may comply with MMC or other protocol. Embodiments of the invention further enable tapping off of a bus and accounting for different operating voltages that may be encountered on different busses. As used herein a bus can include data lines, command lines, a clock, voltages provided by a host to a device, ground, and the like or any combination thereof. Embodiments of the invention can tap some or all of the lines that are included in any given bus.

A protocol analyzer in accordance with embodiments of the invention includes an analyzer, a pod and a tap board or tap. In addition, embodiments of the invention encompass both differential signaling and/or single ended signaling. Some of the differential inputs/outputs can also be implemented as single ended inputs/outputs. As discussed in more detail below, the pod typically includes an FPGA that processes the signals from the bus of the system being analyzed. The pod may also include control status indicators such as LEDs. In one embodiment, the tap and the pod are separate. This enables a relatively inexpensive tap to be manufactured and which can be replaced as necessary. As previously indicated, some connectors have a relatively low insertion cycle count.

The pod can connect to the tap board in at least two different ways. First, the tap board or tap can connect directly with the connector or through a cable. To insure signal integrity, the LVDS (Low Voltage Differential Signaling) signaling may be used. Embodiments of the invention incorporate LVDS signaling in the tap to determine whether signals on the bus are high or low as described below. In some instances, voltage levels may be translated to comply with various signaling requirements of the tap, the pod, and/or the analyzer.

Figure 1:
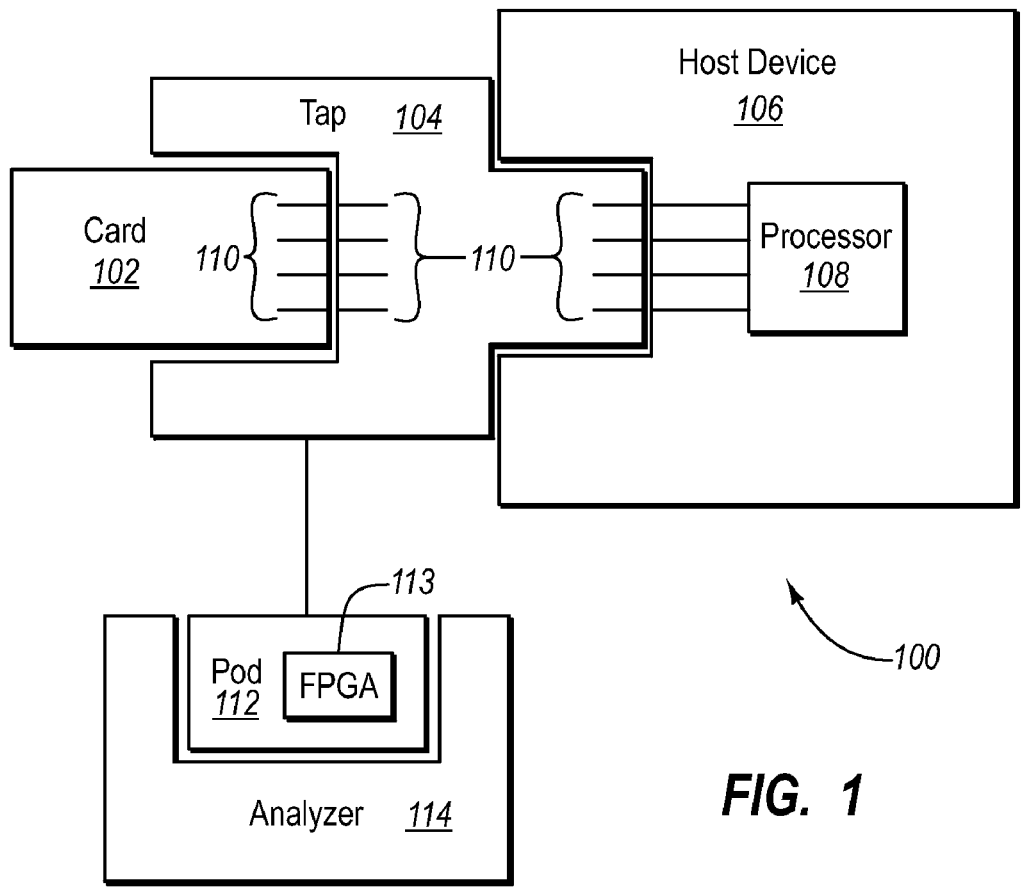
FIG. 1 illustrates an exemplary environment for implementing embodiments of the invention.

FIG. 1 illustrates an exemplary environment for implementing embodiments of the invention. FIG. 1 illustrates a system 100 that includes, in this example, host 106 that connects with a card 102. The card 102 represents various media cards that include, but are not limited to, MMC (Multi Media Card) Card, RS-MMC (Reduced Size-MultiMedia Card), MMCplus, MMCmobile, DV (Dual Voltage) MMC cards, CE-ATA (Consumer Electronics-Advanced Technology Attachment) devices, SD (Secure Digital) Cards, DV (Dual Voltage) SD Cards, SDIO (SD Input/Output) Cards, XD Cards, Memory Stick, and other cards or devices including drives or any combination thereof.

The host 106 is typically configured to read and/or write to the card 102 and the bus is therefore bidirectional. The host 106 represents, by way of example and not limitation, consumer devices such as personal digital assistants, digital cameras, personal audio players, digital media players, digital recorders, cellular telephones, laptop computers, and the like or any combination thereof The communication between the card 102 and the host 106 occurs over the contacts 110 that represent the bus or connection between the card 102 and the host 106. The tap 104 is a device that enables the analyzer 114 to view the traffic occurring on the bus between the card 102 and the host 106 with minimal interference to the bus. The form factor of the tap 104 is often dependent on the form factor dictated by the host 106 and/or the corresponding card 102. In some embodiments, the tap 104 may be configured to accept multiple form factors and/or cards that may use different protocols.

The tap 104 is separate, in one embodiment, from the pod 112 for several reasons. Some protocols have connectors that have a low insertion cycle count as previously described and the ability to replace the tap 104 when the connectors fail is advantageous compared to replacing the entire pod 112. A detachable tap 104 also facilitates use of the analyzer 114 in size constrained areas and for some testing situations, such as vibration testing.

The data on the bus between the card 102 and the host 106 is received at a pod 112 from the tap 104. The pod 112 is adapted to connect with the analyzer 114 although embodiments of the invention contemplate a pod 112 that is integrated with the analyzer 114. Also, the pod 112 can be reprogrammed for use with different protocols in some instances. When the pod 112 is detachable, the removability of the pod 112 from the analyzer 114 permits the analyzer 114 to be adapted to multiple busses, network connections, etc, by selecting the appropriate pod. Alternatively, the pod 112 may receive an ID signal from the tap 104 that indicates how the pod 112 should handle the signals being tapped. Similarly, the pod 112 may generate an ID signal that can be interpreted by the analyzer 114 such that the analyzer 114 can interpret the data received from the pod 112.

In one embodiment, a pod 112 can be used with multiple taps. For instance, the pod 112 may be used with an MMC/SD tap, a CE-ATA tap, or another tap. For a given tap or for a given protocol, the FPGA 113 can be programmed to prepare or decode the signals that are tapped according to the requirements of various protocols. For example, the FPGA can be programmed to handle multiple protocols. In this case, the pod uses the tap ID to determine how to handle the data from the tap. Alternatively, the analyzer can use the tap ID and/or the pod ID to program the FPGA to handle or to decode the signals received from the bus. Typically, the actual programming of the FPGA is performed through an EEPROM, or through Select-Map pins through software.

For example, the specific protocol decoded by the pod is selected based on the ID signal provided by the attached tap. Alternatively, the pod 112, after receiving the ID signal, can then be appropriately programmed by the analyzer 114. In this example, the pod 112 is typically configured for the SD, SDIO, MMC or CE-ATA protocols. The pod 112 can support state listing decoding, command listing decoding, timing waveform, pre-capture filtering, triggering, statistics including real time statistics, histogram, post-capture statistics and filtering, tree view of the captured data, and other protocol functions.

Figure 2:
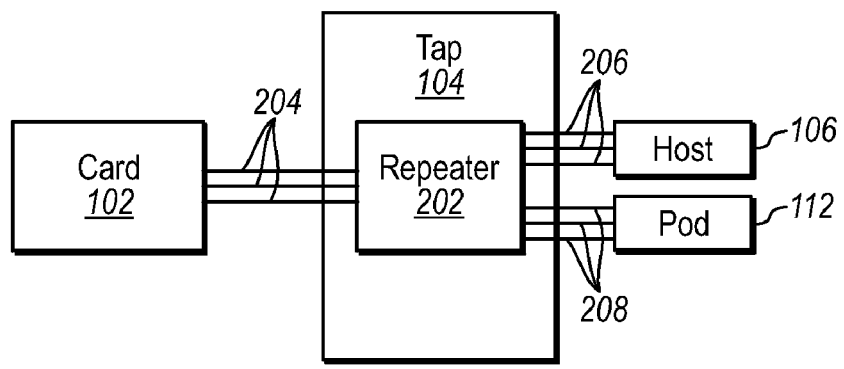
FIG. 2 illustrates one embodiment of a tap that interfaces with a bidirectional bus between a card and a host.

In one embodiment, the tap 104 is a pass-through tap in the sense that the digital signals are not retimed by the tap 104. Also, the bus may be a bi-directional bus. FIG. 2 illustrates an embodiment of the tap 104 that includes a repeater 202. The signals 204 from the card 102 are received by the repeater 202 and then passed through as the signals 206 to the host 106. The signals are also delivered as the signals 208 to the pod 112.

In one embodiment, the signals are tapped off of the bus and then passed through the repeater 202. Thus, the signals 204 and the signals 206 are the same signals. The tap is configured to tap off of the bus lines and provide the bus lines to the repeater 202. More specifically, the signals 208 have been tapped off of the bus and then passed through the repeater 202.

Figure 3:
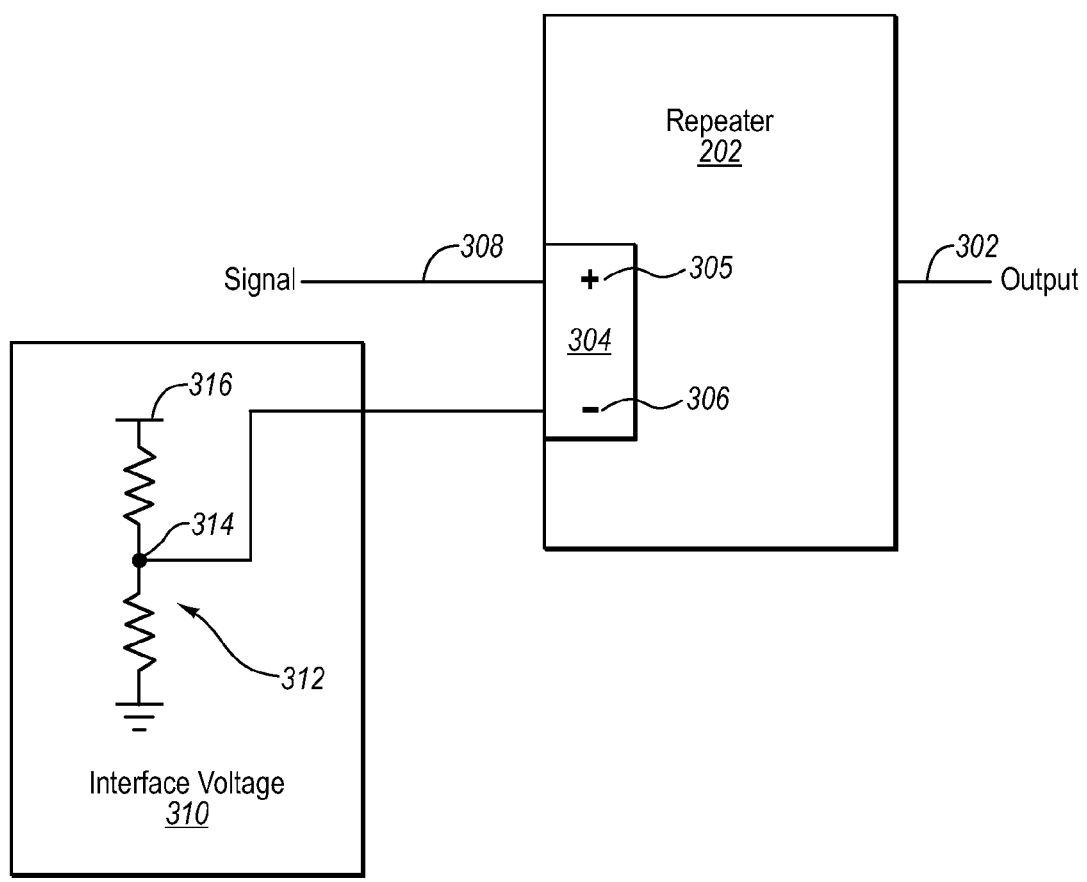
FIG. 3 illustrates an embodiment of circuitry for determining whether signals on the bus are high or low.

As previously mentioned, the operating voltages of the card 102 or of the host 104 can vary and may be, for example, high voltage or dual voltage cards. FIG. 3 illustrates the circuitry used to determine whether the signals on the bus are high or low, even in situations where the actual operating voltage is unknown. For a given tap, multiple repeaters may be used.

In one embodiment, the signals between the card 102 and the host 106 do not pass through the repeater. Rather, the tap 104 is configured such that the bus lines are tapped (using a via or the pins on the repeater chip itself for example) to branch the bus lines and corresponding signals off to the repeater 202. The traces or vias or chip pins that branch off to the repeater result in the signals 208 that are delivered to the pod 112. To minimize capacitive loading, the stubs created by branching off of the bus lines are kept as short as possible. In addition, there is no internal termination in the repeater 202 to maintain impedance matching.

In FIG. 3, the repeater 202 has enough inputs for each line of the bus and the repeater 202 generates an output 302 for each line on the bus. The output 302 or the outputs collectively of the repeater 202 are provided to the pod 112. The output 302 can be single ended signals or differential signals. Each input to the repeater 202, in this example, is a differential input 304. The input 305 is connected to the signal 308. Similarly, other signals of the bus are connected to a similar input on corresponding differential inputs.

As previously stated, the tap or the pod does not necessarily know what the input signals 308 represent. One advantage of using a repeater with differential inputs is that whether the input signal 308 is high or low can be determined using the other input to the differential input 305. For example, the input 306 of the differential input 304 is connected to an interface voltage 310. The input 316 to the interface voltage 310 is obtained off of the bus or is the Vcc line of the bus. A voltage divider 312 is then provided such that the voltage 314 is approximately (0.625*Vcc) in this example. One of skill in the art can appreciate that the voltage divider 312 can be set at any appropriate ration and that the ratio may be selected according to a particular protocol being analyzed. By dividing the Vcc voltage in this manner, a determination can effectively be made regarding whether the signal 308 is high or low based on comparison with the voltage 314 at the input 306. In this example, the differential input is used not for a differential signal pair, but for a signal 308 and a reference signal from the interface voltage 310 that enables the state (e.g., high or low) of the signal 308 to be identified.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An apparatus for tapping a system that includes a host and a card, the apparatus comprising:
    a first end that connects with a host;
    a second end that connects with a card;
    a pass through bus connecting the first end and the second end such that the host continues to operate with the card over the pass through bus;
    a repeater that connects to the pass through bus, the repeater having a differential input, a first input of the differential input connected with a line of the bus and a second input of the differential input connected to a reference voltage that enables a signal on the line of the bus to be identified as a high signal or a low signal without knowing a value of the high signal;
    an interface voltage circuit that generates the reference voltage provided to the second input of the differential input;
    a pod that removably connects with the apparatus and that removably connects with a protocol analyzer;
    a tap that removably connects to the pod and one of the following:
        a memory that stores an ID, the ID corresponding to a protocol for which the apparatus is configured; or
        a hard-coded ID.

2. The apparatus of claim 1, wherein the interface voltage circuit receives an input from the bus that corresponds to a high signal.

3. The apparatus of claim 2, wherein the input from the bus received by the interface voltage circuit comprises a Vcc of the bus.

4. The apparatus of claim 1, wherein the pod receives the ID from the memory or from the hard-coded ID and generates a signal that includes the received ID such that the protocol analyzer can interpret data tapped from the bus and wherein the pod comprises an FPGA that can be prepared for multiple protocols such that more than one type of tap can be used with the pod.

5. The apparatus of claim 1, further comprising a second repeater, each repeater having a plurality of differential inputs.

6. The apparatus of claim 5, wherein a first input in each of the plurality of differential inputs receives a reference voltage from an interface voltage circuit.

7. The apparatus of claim 6, wherein a comparison of a signal on the bus with the reference voltage determines if the signal on the bus is high or low.

8. The apparatus of claim 6, wherein the repeater has an output for each differential input, each output being a single ended output or a low voltage differential output.

9. The apparatus of claim 6, wherein the interface voltage circuit is a voltage divider that divides a Vcc of the bus to about 0.625 volts.

10. The apparatus of claim 1, wherein the card is a SD (Secure Digital Card), SDIO (SD Input/Output Card), MMC (Multimedia Card), or CE-ATA (Consumer Electronics-Advanced Technology Attachment) card.

11. The apparatus of claim 1, wherein the pass through bus comprises data lines, command lines, a clock, voltages provided by a host to a device or any combination thereof.

12. The apparatus of claim 1, wherein the host is a personal digital assistant, a digital camera, a personal audio player, a digital media player, a digital recorder, a cellular telephone, or a laptop computer or any combination thereof.

13. The apparatus of claim 1, wherein the pod includes an FPGA that processes signals from the bus of the system being analyzed.

14. The apparatus of claim 1, wherein the pod is integrated with the protocol analyzer.

15. The apparatus of claim 1, wherein the pod includes control status indicators.

16. The apparatus of claim 6, wherein the tap is configured such that the bus lines are tapped to branch the bus lines and corresponding signals off to the repeater.

17. The apparatus of claim 1, wherein the tap is a non-intrusive pass-through tap.

* * * * *